(12) United States Patent
Wei

(10) Patent No.: US 9,325,816 B2
(45) Date of Patent: Apr. 26, 2016

(54) DISPLAYING METHOD AND PORTABLE DEVICE

(71) Applicant: HTC Corporation, Taoyuan County (TW)

(72) Inventor: Chih-Sheng Wei, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 334 days.

(21) Appl. No.: 13/956,386

(22) Filed: Aug. 1, 2013

(65) Prior Publication Data

US 2015/0038196 A1 Feb. 5, 2015

(51) Int. Cl.
*G09G 5/00* (2006.01)
*H04M 1/02* (2006.01)
*G06F 1/16* (2006.01)
*G06F 3/14* (2006.01)

(52) U.S. Cl.
CPC ........... *H04M 1/0235* (2013.01); *G06F 1/1624* (2013.01); *G06F 1/1694* (2013.01); *G06F 3/1423* (2013.01); *H04M 1/0266* (2013.01); *G06F 2200/1614* (2013.01); *G06F 2200/1637* (2013.01); *G09G 2340/0407* (2013.01); *G09G 2340/0492* (2013.01); *G09G 2340/14* (2013.01); *G09G 2356/00* (2013.01); *H04M 1/0245* (2013.01); *H04M 2250/12* (2013.01); *H04M 2250/16* (2013.01)

(58) Field of Classification Search
CPC .................................................. G06F 1/1624
See application file for complete search history.

(56) References Cited

U.S. PATENT DOCUMENTS

| 7,386,331 | B2 * | 6/2008 | Hyun | H04M 1/0237 379/433.11 |
| 2008/0287169 | A1 * | 11/2008 | Kim | G06F 1/1624 455/575.4 |
| 2009/0156264 | A1 * | 6/2009 | Cho | G06F 1/1624 455/566 |
| 2011/0143769 | A1 * | 6/2011 | Jones | G06F 1/1624 455/456.1 |
| 2012/0001829 | A1 * | 1/2012 | Anttila | G06F 3/1431 345/1.1 |
| 2012/0162263 | A1 * | 6/2012 | Griffin | G06F 1/1624 345/652 |

FOREIGN PATENT DOCUMENTS

| CN | 101309311 | 11/2008 |
| CN | 102053794 | 5/2011 |

OTHER PUBLICATIONS

"Office Action of Taiwan Counterpart Application", issued on Jan. 22, 2015, p. 1-p. 4.

* cited by examiner

*Primary Examiner* — Charles Tseng
(74) *Attorney, Agent, or Firm* — Jianq Chyun IP Office

(57) ABSTRACT

A displaying method for a portable device is provided. The portable device includes a top body and a bottom body, wherein the top body is stacked on the bottom body. In the displaying method, a relative sliding movement of the top body sliding along a sliding direction corresponding to the bottom body is sensed. A gravity direction of the portable device is sensed. According to a direction relationship between the gravity direction and the sliding direction, a display on the top body displays an operation frame corresponding to the direction relationship.

6 Claims, 3 Drawing Sheets

DISPLAYING METHOD AND PORTABLE DEVICE

BACKGROUND OF THE INVENTION

1. Field of the Invention

The invention relates to a displaying method and a portable device, and more particularly, to a displaying method capable of switching between different display frames in accordance with different orientations of the portable device.

2. Description of Related Art

A handheld electronic device refers to an electronic device which can be held and operated in a user's hand, such as mobile phone, multimedia player, personal digital assistant (PDA), pocket PC, handheld game console, and handheld satellite navigator. These electronic devices are usually of smaller size and weight so that they can be carried around with ease. In the case of mobile phones, for example, early mobile phones have a vertical design. However, in order to enhance the portability of mobile phones but not to reduce the display screen size and the keypad area, folder-type mobile phones and slide-type mobile phones are thus developed.

With regard to slide-type mobile phones, most of current slide-type mobile phones accomplish relative vertical or horizontal movements between their two bodies by adopting a sliding mechanism. Thus the two bodies show various different appearances. Furthermore, by combining these appearances with corresponding software functions, the slide-type mobile phones may be operated in various modes, such as standby mode, telephone mode, message mode, and so on.

However, whether using a slide-type mobile phone or a folder-type mobile phone, the user has to use fingers or input tools to slide across a touch screen or to press physical or virtual keys in order to switch from one display page to another. That is to say, whenever an upper cover of a slide-type mobile phone is slid open, or an upper folder of a folder-type mobile phone is unfolded, the mobile phone displays a main frame preset by factory settings. In this way, the manner of displaying the frames lacks variety. Meanwhile, in order to have a specific operation page displayed, the user has to perform several touch operations or physical pressing operations, which is inconvenient.

SUMMARY OF THE INVENTION

The invention provides a displaying method capable of presenting various different human-machine interfaces in accordance with combinations of display states and gravity directions of a portable device.

The invention provides a portable device that offers users more convenience in operation.

The invention proposes a displaying method for a portable device. The portable device includes a top body and a bottom body, wherein the top body is stacked on the bottom body. The displaying method includes the following steps. A relative sliding movement of the top body sliding along a sliding direction corresponding to the bottom body is sensed. A gravity direction of the portable device is sensed. According to a direction relationship between the gravity direction and the sliding direction, an operation frame corresponding to the direction relationship is displayed on a display on the top body.

In an embodiment of the invention, in the aforementioned displaying method, the top body has a front surface and a back surface opposite to the front surface. The display is disposed on the front surface. The top body is stacked on the bottom body while an operation face of the bottom body faces the back surface. The portable device is extended while the top body slides along the sliding direction corresponding to the bottom body to expose the operation face of the bottom body. According to the direction relationship between the gravity direction and the sliding direction, the step of displaying the operation frame corresponding to the direction relationship on the display on the top body further includes the following step. The operation frame and the exposed operation face constitute a human-machine interface corresponding to the direction relationship.

In an embodiment of the invention, in the aforementioned displaying method, the step of constituting the human-machine interface corresponding to the direction relationship by the operation frame and the exposed operation face includes the following step. According to the gravity direction, whether the portable device is in a portrait displaying mode or in a landscape displaying mode is identified. When the portable device is in the portrait displaying mode and the gravity direction is the same as the sliding direction, the operation frame and the exposed operation face constitute a first human-machine interface. When the portable device is in the portrait displaying mode and the gravity direction is opposite to the sliding direction, the operation frame and the exposed operation face constitute a second human-machine interface. When the portable device is in the landscape displaying mode and a first outer product vector of an outer product of the gravity direction and the sliding direction points out of the portable device, the operation frame and the exposed operation face constitute a third human-machine interface. When the portable device is in the landscape displaying mode and a second outer product vector of the outer product of the gravity direction and the sliding direction points into the portable device, the operation frame and the exposed operation face constitute a fourth human-machine interface. The first human-machine interface, the second human-machine interface, the third human-machine interface, and the fourth human-machine interface are different from one another.

In an embodiment of the invention, in the aforementioned displaying method, the step of constituting a human-machine interface corresponding to the direction relationship by the operation frame and the exposed operation face further includes the following step. According to the gravity direction, whether the portable device is in a lying-down displaying mode is identified. In the lying-down displaying mode, the operation frame and the exposed operation face constitute the first human-machine interface.

In an embodiment of the invention, in the aforementioned displaying method, the operation face includes a sub-display to correspondingly display a virtual keypad, a sub-frame relative to a main frame displayed on the display or an audio-video interface according to the direction relationship between the gravity direction and the sliding direction.

The invention further proposes a portable device including a top body, a display, a bottom body, a sliding sensor, a gravity sensor, a storage medium and a processor. The top body has a front surface and a back surface opposite to the front surface. The display is disposed on the front surface. The bottom body has an operation face. The top body is stacked on the bottom body while the operation face of the bottom body faces the back surface. The sliding sensor senses that the portable device is extended while the top body slides along the sliding direction corresponding to the bottom body so as to generate an extension signal. The gravity sensor senses a gravity direction of the portable device. The storage medium stores a computer readable and writable program. The processor executes a plurality of commands of the computer readable and writable program according to the extension signal. The commands include the following command. According to a direction relationship between the gravity direction and the sliding direction, an operation frame corresponding to the direction relationship is displayed on the display.

In an embodiment of the invention, in the aforementioned portable device, the portable device is extended while the top body slides along the sliding direction corresponding to the bottom body to expose the operation face of the bottom body. According to the direction relationship between the gravity direction and the sliding direction, the command of displaying the operation frame corresponding to the direction relationship on the display further includes the following command. The operation frame and the exposed operation face constitute a human-machine interface corresponding to the direction relationship.

In an embodiment of the invention, in the portable device, the command of constituting the human-machine interface corresponding to the direction relationship by the operation frame and the exposed operation face includes the following command. According to the gravity direction, whether the portable device is in a portrait displaying mode or in a landscape displaying mode is identified. When the portable device is in the portrait displaying mode and the gravity direction is the same as the sliding direction, the operation frame and the exposed operation face constitute a first human-machine interface. When the portable device is in the portrait displaying mode and the gravity direction is opposite to the sliding direction, the operation frame and the exposed operation face constitute a second human-machine interface. When the portable device is in the landscape displaying mode and a first outer product vector of the outer product of the gravity direction and the sliding direction points out of the portable device, the operation frame and the exposed operation face constitute a third human-machine interface. When the portable device is in the landscape displaying mode and a second outer product vector of the outer product of the gravity direction and the sliding direction points into the portable device, the operation frame and the exposed operation face constitute a fourth human-machine interface. The first human-machine interface, the second human-machine interface, the third human-machine interface, and the fourth human-machine interface are different from one another.

In an embodiment of the invention, in the aforementioned portable device, the command of constituting a human-machine interface corresponding to the direction relationship by the operation frame and the exposed operation face further includes the following command. According to the gravity direction, whether the portable device is in a lying-down displaying mode is identified. In the lying-down displaying mode, the operation frame and the exposed operation face constitute the first human-machine interface.

In an embodiment of the invention, in the aforementioned portable device, the operation face includes a sub-display to correspondingly display a virtual keypad, a sub-frame relative to a main frame displayed on the display or an audio-video interface according to the direction relationship between the gravity direction and the sliding direction.

Based on the above, by various combinations (direction relationships) of the gravity direction and the sliding direction in which the portable device is placed corresponding respectively to various different human-machine interfaces, the invention provides the user with a method for promptly switching between display frames on the display, as well as visual effects of diverse displaying manners. Further, the user is offered more convenience in operating the portable device.

To make the above features and advantages of the invention more comprehensible, embodiments accompanied with drawings are described in detail as follows.

DETAILED DESCRIPTION OF DISCLOSED EMBODIMENTS

Figure 1:
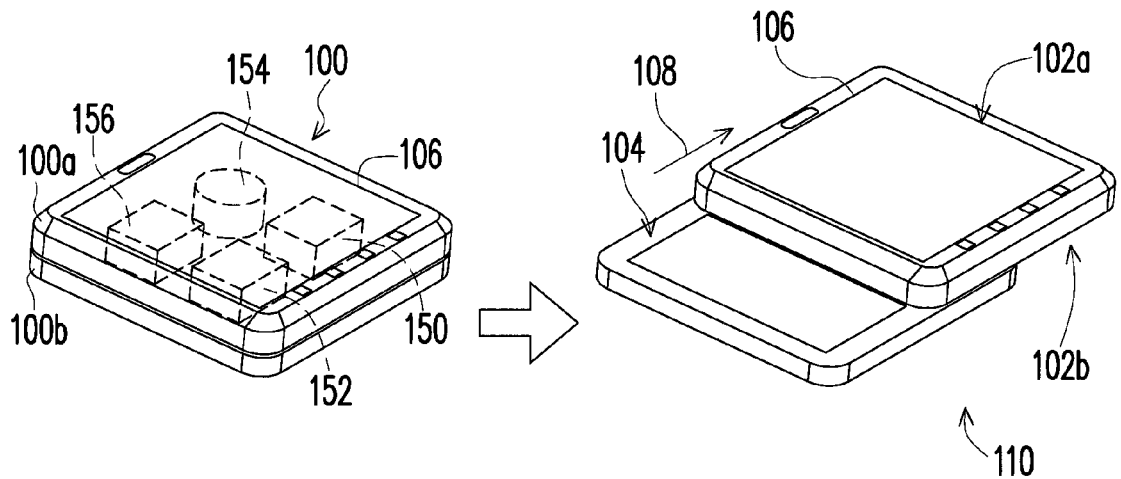
FIG. 1 is a simplified schematic diagram of a portable device according to an embodiment of the invention.
Figure 2:
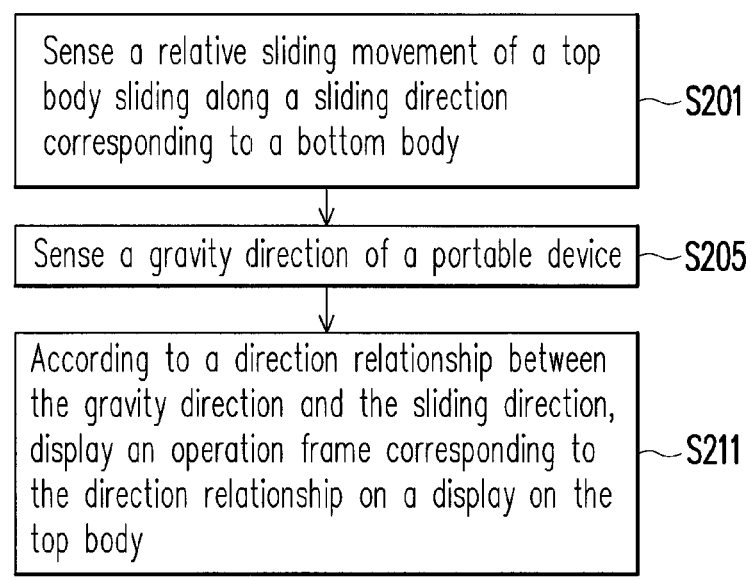
FIG. 2 is a simplified flow chart of a displaying method according to an embodiment of the invention.

FIG. 1 is a simplified schematic diagram of a portable device according to an embodiment of the invention. FIG. 2 is a simplified flow chart of a displaying method according to an embodiment of the invention. Referring to FIG. 1, a portable device 100 in the present embodiment includes a top body 100a and a bottom body 100b. The top body 100a has a front surface 102a and a back surface 102b opposite to the front surface 102a. The bottom body 100b has an operation face 104. A display 106 is disposed on the front surface 102a. The top body 100a is stacked on the bottom body 100b while the operation face 104 of the bottom body 100b faces the back surface 102b. In addition, the operation face 104 is, for example, a physical keypad, or at least includes a sub-display to correspondingly display a virtual keypad, a sub-frame relative to a main frame displayed on the display or an audio-video interface according to the direction relationship between the gravity direction and the sliding direction.

Referring to FIG. 1 and FIG. 2, in step S201, a relative sliding movement of the top body 100a sliding along a sliding direction 108 corresponding to the bottom body 100b is sensed. Then, in step S205, a gravity direction of the portable device 100 is sensed. After that, in step S211, according to a direction relationship between the gravity direction and the sliding direction, an operation frame corresponding to the direction relationship is displayed on the display 106 on the top body 100a. That is to say, according to the sensed different direction relationships between the gravity direction and the sliding direction, the display 106 correspondingly displays various operation frames (operation interfaces).

In addition, when the portable device 100 is extended while the top body 100a slides along the sliding direction 108 corresponding to the bottom body 100b (as an extended state 110 shown in FIG. 1), the operation face 104 of the bottom body 100b is exposed on the extended portable device 100. Accordingly, the display 106 on the top body 100a displays operation frames corresponding to different direction relationships between the gravity direction and the sliding direction. Moreover, the corresponding operation frame displayed on the display 106 and the operation face 104 exposed on the extended portable device 100 constitute a human-machine interface corresponding to the direction relationship. That is to say, not only the display 106 changes its displayed operation frame correspondingly to variation in the direction relationship, but also the operation face 104 of the bottom body 100b performs different functions corresponding to variation in the direction relationship. Therefore, as the direction relationship between the gravity direction and the sliding direction varies, the human-machine interface consisting of the operation frame and the operation face varies correspondingly. In this way, by means of identification of different combinations of the gravity direction and the sliding direction, various different operation interfaces are automatically offered to the user, and thus the convenience of use is improved.

Figure 3:
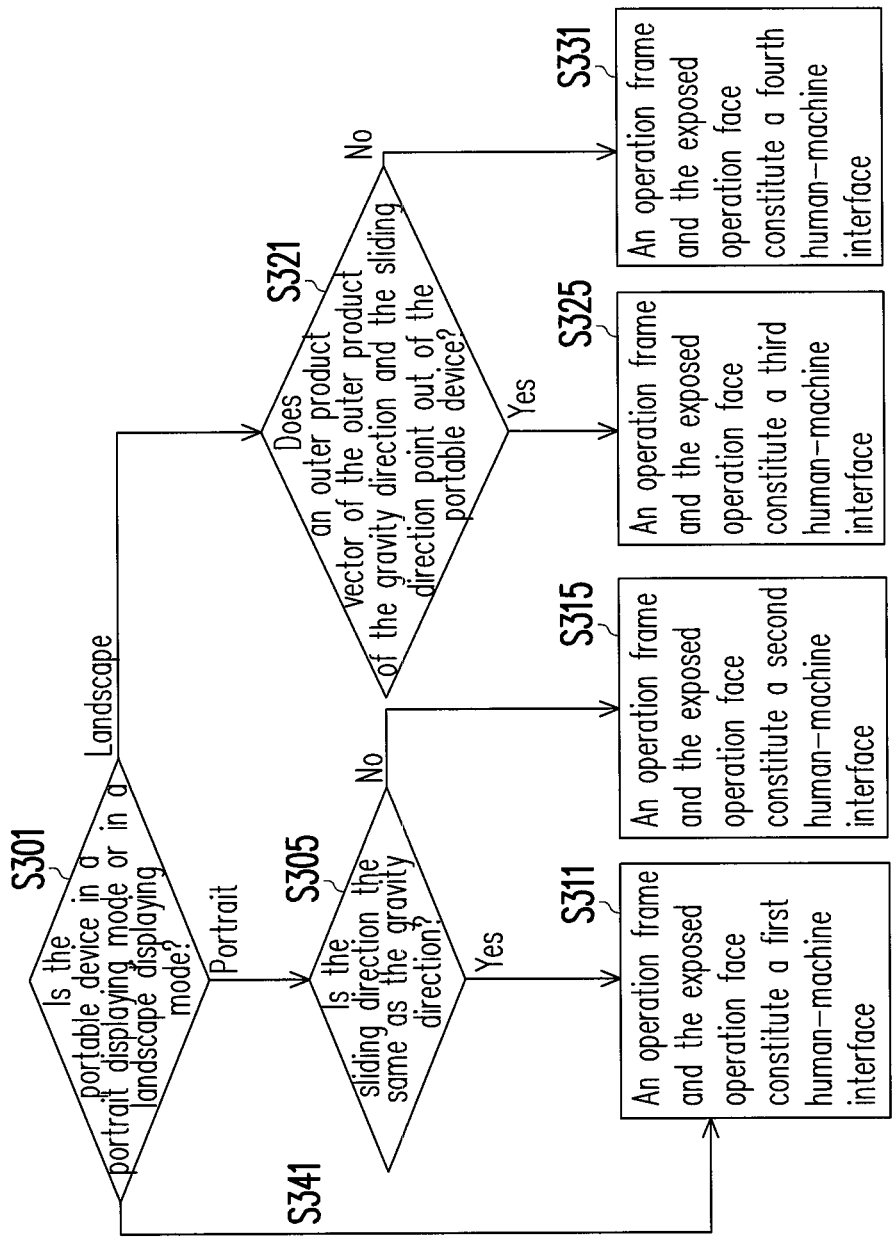
FIG. 3 is a simplified flow chart of a process of displaying an operation frame corresponding to direction relationships on a display.

An embodiment is described hereinafter with reference to drawings, which illustrates a process flow of displaying different operation frames on a display (i.e. changing a human-machine interface consisting of an operation frame and an operation face) by identifying the variation in combinations (direction relationships) of gravity directions and sliding directions. FIG. 3 is a simplified flow chart of process of displaying an operation frame corresponding to direction relationships on a display. FIGS. 4A to 4D are schematic diagrams of various direction relationships between gravity directions and sliding directions of a portable device.

Referring to FIG. 1 and FIG. 3, in step S301, according to a sensed gravity direction, whether a portable device is in a portrait displaying mode or in a landscape displaying mode is identified. In step S305, when the portable device is in the portrait displaying mode, a direction relationship between a sliding direction and the gravity direction is identified, which means, whether the sliding direction and the gravity direction are the same is identified. In step S311, when the gravity direction is the same as the sliding direction, an operation frame displayed on the display 106 and the exposed operation face 104 constitute a first human-machine interface. That is to say, when the gravity direction has the same vertical component as the sliding direction, the operation frame on the display 106 is switched solely (i.e. only the operation frame is switched but the operation face 104 is not switched), the operation face 104 is switched solely (i.e. only the operation face 104 is switched but the operation frame is not switched), or the operation frame and the operation face 104 are switched at the same time (i.e. both the operation frame and the operation face 104 are switched), so that the first human-machine interface consisting of the operation frame and the operation face 104 corresponds to the direction relationship.

Figure 4A:
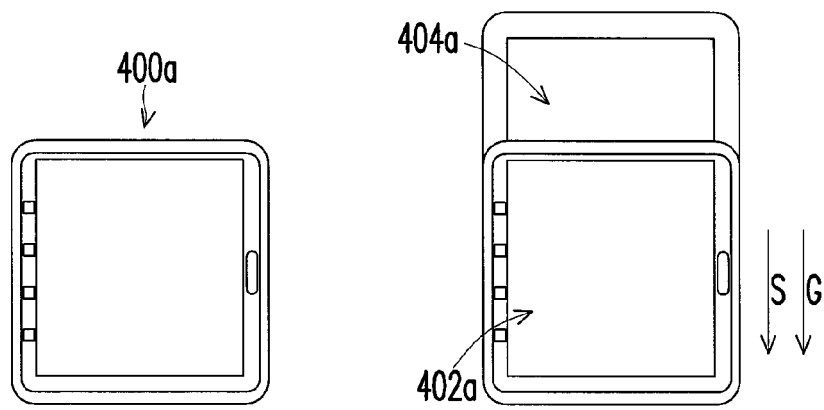
FIGS. 4A to 4D are schematic diagrams of various direction relationships between gravity directions and sliding directions of a portable device.

More specifically, referring to FIG. 4A, when the portable device is in a portrait displaying mode 400a, and a gravity direction G is the same as a sliding direction S in which the top body 100a slides corresponding to the bottom body 100b, a human-machine interface consisting of an operation frame 402a and an operation face 404a corresponds to a direction relationship between the gravity direction G and the sliding direction S.

Meanwhile, in step S315, when the portable device is in the portrait displaying mode and it is identified that the gravity direction is opposite to the sliding direction, the operation frame displayed on the display 106 and the exposed operation face 104 constitute a second human-machine interface. That is to say, when the gravity direction is opposite to a vertical component of the sliding direction, the operation frame on the display 106 is switched solely, the operation face 104 is switched solely, or the operation frame and the operation face 104 are switched at the same time, so that the second human-machine interface consisting of the operation frame and the operation face 104 corresponds to the direction relationship.

Figure 4B:
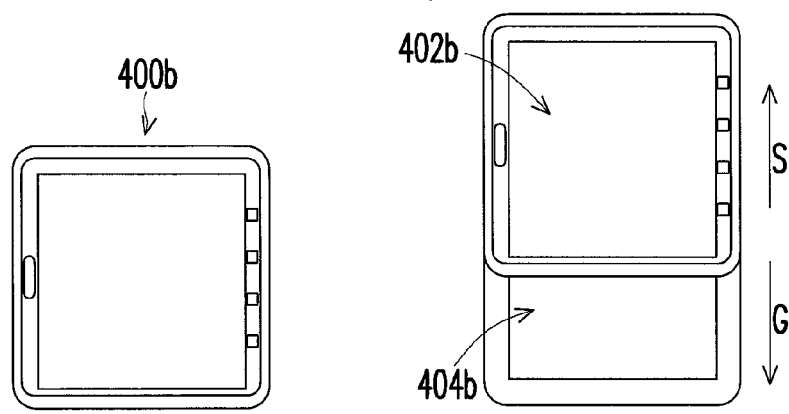

More specifically, referring to FIG. 4B, when the portable device is in a portrait displaying mode 400b, and the gravity direction G is opposite to the sliding direction S in which the top body 100a slides corresponding to the bottom body 100b, a human-machine interface consisting of an operation frame 402b and an operation face 404b corresponds to the direction relationship between the gravity direction G and the sliding direction S. It is to be noted that in both embodiments of FIG. 4A and FIG. 4B, the portable device is in the portrait displaying mode. However, a difference lies in that the orientation in which the portable device in FIG. 4A is placed is upside down relative to the orientation in which the portable device in FIG. 4B is placed.

In addition, in step S321, when the portable device is in the landscape displaying mode, the direction relationship between the sliding direction and the gravity direction is identified, which means, whether an outer product vector of the outer product of the gravity direction and the sliding direction points out of the portable device is identified. In step S325, when the outer product vector of the outer product of the gravity direction G and the sliding direction S points out of the portable device, the operation frame displayed on the display 106 and the exposed operation face 104 constitute a third human-machine interface. That is to say, when the outer product vector of the outer product of the gravity direction and a horizontal component of the sliding direction points out of the portable device, the operation frame on the display 106 is switched solely, the operation face 104 is switched solely, or the operation frame and the operation face 104 are switched at the same time, so that the third human-machine interface consisting of the operation frame and the operation face 104 corresponds to the direction relationship.

Figure 4C:
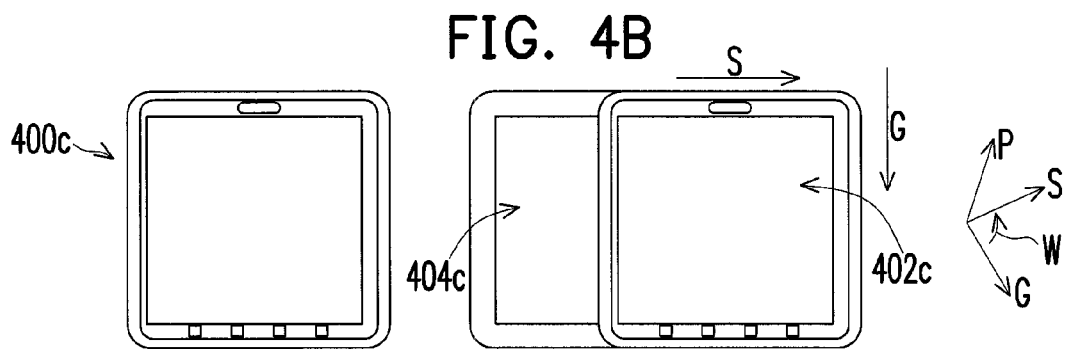

More specifically, referring to FIG. 4C, when the portable device is in a landscape displaying mode 400c, and an outer product vector P of the outer product (as introduced by an arrow W) of the gravity direction G and the sliding direction S in which the top body 100a slides corresponding to the bottom body 100b points out of the portable device (the solid-line arrow indicating pointing out of the portable device), a human-machine interface consisting of an operation frame 402c and an operation face 404c corresponds to the direction relationship between the gravity direction G and the sliding direction S.

In addition, in step S331, when the portable device is in the landscape displaying mode, and it is identified that the outer product vector of the outer product of the gravity direction and the sliding direction points into the portable device, the operation frame displayed on the display 106 and the exposed operation face 104 constitute a fourth human-machine interface. The first human-machine interface, the second human-machine interface, the third human-machine interface, and the fourth human-machine interface mentioned above are different from one another. That is to say, when the outer product vector of the outer product of the gravity direction and the horizontal component of the sliding direction points into the portable device, the operation frame on the display 106 is switched solely, the operation face 104 is switched solely, or the operation frame and the operation face 104 are switched at the same time, so that the fourth human-machine interface consisting of the operation frame and the operation face 104 corresponds to the direction relationship.

Figure 4D:
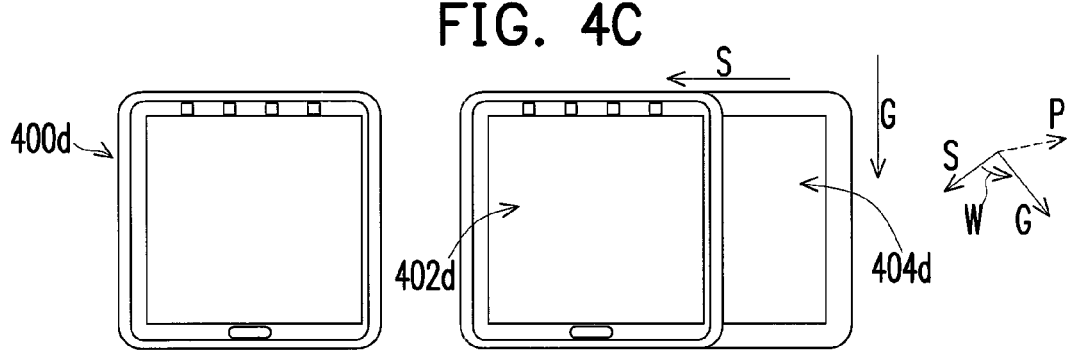

More specifically, referring to FIG. 4D, when the portable device is in a landscape displaying mode 400d, and the outer product vector P of the outer product (as introduced by an arrow W) of the gravity direction G and the sliding direction S in which the top body 100a slides corresponding to the bottom body 100b points into the portable device (the dashed-line arrow indicating pointing into the portable device), a human-machine interface consisting of an operation frame 402d and an operation face 404d corresponds to the direction relationship between the gravity direction G and the sliding direction S. It is to be noted that in both embodiments of FIG. 4C and FIG. 4D, the portable device is in the landscape displaying mode. However, a difference lies in that the orientation of the portable device in FIG. 4C is left-right reversed from the orientation of the portable device in FIG. 4D.

In all the embodiments of FIG. 3 and FIGS. 4A to 4D, the sliding direction in which the top body 100a of the portable device slides corresponding to the bottom body 100b is parallel to a long axis of the portable device. However, the invention is not limited thereto. That is to say, in the event that the sliding direction in which the top body 100a of the portable device slides corresponding to the bottom body 100b is parallel to a short axis of the portable device, when identifying the direction relationship between the gravity direction and the sliding direction, the identification steps in step S305 and step S321 may be swapped, thus complying with the spirit of the invention without deviating from the scope thereof.

In addition, in all the embodiments of FIG. 3 and FIGS. 4A to 4D, the portable device has a long axis and a short axis shorter than the long axis. Nonetheless, the invention is not limited thereto. In an embodiment, in the event that the long axis and the short axis of the portable device are of the same length, the identification of the displaying mode in step S301 may be replaced by identification of whether the vertical component or the horizontal component is the maximum component of the sliding direction of the portable device in space. When the vertical component is the maximum component of the sliding direction in space, step S305 is executed. Meanwhile, when the horizontal component is the maximum component of the sliding direction in space, step S321 is executed.

In addition, in another embodiment of the invention, the step of constituting a human-machine interface corresponding to the direction relationship by the operation frame and the exposed operation face further includes the following step. According to the gravity direction, whether the portable device is in a lying-down displaying mode is identified (as shown by an arrow S341 in FIG. 3). In the lying-down displaying mode of the portable device, the operation frame displayed on the display 106 and the exposed operation face 104 (as shown in FIG. 1) constitute the first human-machine interface.

In addition, referring to FIG. 1, the portable device 100 in the present embodiment includes the top body 100a, the bottom body 100b, the display 106 disposed on the top body 100a, a sliding sensor 150, a gravity sensor 152, a storage medium 154 and a processor 156. The sliding sensor 150 senses that the portable device 100 is extended while the top body 100a slides along a sliding direction corresponding to the bottom body 100b (as the extended state 110 shown in FIG. 1), so as to generate an extension signal. The gravity sensor 152 senses a gravity direction of the portable device 100. The storage medium 154 stores a computer readable and writable program. The processor 156 executes a plurality of commands of the computer readable and writable program according to the extension signal, thereby realizing the displaying method described in the aforementioned embodiments. These commands include the following: as in the aforementioned embodiments, according to the direction relationship between the gravity direction and the sliding direction, an operation frame corresponding to the direction relationship is displayed on the display 106 (step S211), and different operation frames are displayed on the display (i.e. the human-machine interfaces consisting of the operation frame and the operation face are varied) by identifying the variation in the combinations (direction relationships) of the gravity direction and the sliding direction (steps S301~S341). Since the steps corresponding to the commands are clearly described in the aforementioned embodiments, no further description is provided herein.

In summary, by various combinations (direction relationships) of the gravity direction in which the portable device is placed and the sliding direction corresponding respectively to various different human-machine interfaces, the invention provides the user with a method for promptly switching between display frames on the display, as well as visual effects of diverse displaying manners. Further, the user is offered more convenience in operating the portable device.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A displaying method for a portable device, wherein the portable device comprises a top body and a bottom body, and the top body is stacked on the bottom body, wherein the top body has a front surface and a back surface opposite to the front surface, the display is disposed on the front surface, the top body is stacked on the bottom body while an operation face of the bottom body faces the back surface, the displaying method comprising:

sensing a relative sliding movement of the top body sliding along a sliding direction corresponding to the bottom body to expose the operation face of the bottom body;

sensing a gravity direction of the portable device; and according to a direction relationship between the gravity direction and the sliding direction, displaying an operation frame corresponding to the direction relationship on a display on the top body, and constituting a human-machine interface corresponding to the direction relationship by the operation frame and the exposed operation face, wherein the step of constituting the human-machine interface corresponding to the direction relationship by the operation frame and the exposed operation face comprises:

according to the gravity direction, identifying whether the portable device is in a portrait displaying mode or in a landscape displaying mode;

in response to identifying the portable device is in the portrait displaying mode and the gravity direction is the same as the sliding direction, constituting a first human-machine interface by the operation frame and the exposed operation face;

in response to identifying the portable device is in the portrait displaying mode and the gravity direction is opposite to the sliding direction, constituting a second human-machine interface by the operation frame and the exposed operation face;

in response to identifying the portable device is in the landscape displaying mode and a first outer product vector of an outer product of the gravity direction and the sliding direction points out of the portable device, constituting a third human-machine interface by the operation frame and the exposed operation face; and in response to identifying the portable device is in the landscape displaying mode and a second outer product vector of the outer product of the gravity direction and the sliding direction points into the portable device, constituting a fourth human-machine interface by the operation frame and the exposed operation face;

wherein the first human-machine interface, the second human-machine interface, the third human-machine interface, and the fourth human-machine interface are different from one another.

2. The displaying method of claim 1, wherein the step of constituting the human-machine interface corresponding to the direction relationship by the operation frame and the exposed operation face further comprises:
   according to the gravity direction, identifying whether the portable device is in a lying-down displaying mode; and
   in the lying-down displaying mode, constituting the first human-machine interface by the operation frame and the exposed operation face.

3. The displaying method of claim 1, wherein the operation face comprises a sub-display to display a virtual keypad, a sub-frame relative to a main frame displayed on the display or an audio-video interface according to the direction relationship between the gravity direction and the sliding direction.

4. A portable device, comprising:
   a top body having a front surface and a back surface opposite to the front surface;
   a display disposed on the front surface;
   a bottom body having an operation face, wherein the top body is stacked on the bottom body while the operation face of the bottom body faces the back surface;
   a sliding sensor sensing that the portable device is extended while the top body slides along the sliding direction corresponding to the bottom body to expose the operation face of the bottom body so as to generate an extension signal;
   a gravity sensor sensing a gravity direction of the portable device;
   a storage medium storing a computer readable and writable program;
   a processor executing a plurality of commands of the computer readable and writable program according to the extension signal, wherein the commands comprise:
   according to a direction relationship between the gravity direction and the sliding direction, displaying an operation frame corresponding to the direction relationship on the display, and constituting a human-machine interface corresponding to the direction relationship by the operation frame and the exposed operation face,
   wherein the command of constituting the human-machine interface corresponding to the direction relationship by the operation frame and the exposed operation face comprises:
      according to the gravity direction, identifying whether the portable device is in a portrait displaying mode or in a landscape displaying mode;
      in response to identifying the portable device is in the portrait displaying mode and the gravity direction is the same as the sliding direction, constituting a first human-machine interface by the operation frame and the exposed operation face;
      in response to identifying the portable device is in the portrait displaying mode and the gravity direction is opposite to the sliding direction, constituting a second human-machine interface by the operation frame and the exposed operation face;
      in response to identifying the portable device is in the landscape displaying mode and a first outer product vector of an outer product of the gravity direction and the sliding direction points out of the portable device, constituting a third human-machine interface by the operation frame and the exposed operation face; and
      in response to identifying the portable device is in the landscape displaying mode and a second outer product vector of the outer product of the gravity direction and the sliding direction points into the portable device, constituting a fourth human-machine interface by the operation frame and the exposed operation face;
   wherein the first human-machine interface, the second human-machine interface, the third human-machine interface, and the fourth human-machine interface are different from one another.

5. The portable device of claim 4, wherein the command of constituting a human-machine interface corresponding to the direction relationship by the operation frame and the exposed operation face further comprises:
   according to the gravity direction, identifying whether the portable device is in a lying-down displaying mode; and
   in the lying-down displaying mode, constituting the first human-machine interface by the operation frame and the exposed operation face.

6. The portable device of claim 4, wherein the operation face comprises a sub-display to display a virtual keypad, a sub-frame relative to a main frame displayed on the display or an audio-video interface according to the direction relationship between the gravity direction and the sliding direction.

* * * * *